United States Patent
Bosukonda et al.

(10) Patent No.: US 11,292,094 B2
(45) Date of Patent: Apr. 5, 2022

(54) AUTOMATED TIGHTENING OF BOLTS

(71) Applicant: Vestas Wind Systems A/S, Aarhus N. (DK)

(72) Inventors: Pradeep Bosukonda, Århus V (DK); Per Sveigaard Mikkelsen, Tjele (DK); Tobias Østergaard Rossel, Skødstrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 200 days.

(21) Appl. No.: 16/769,350

(22) PCT Filed: Nov. 26, 2018

(86) PCT No.: PCT/DK2018/050308
§ 371 (c)(1),
(2) Date: Jun. 3, 2020

(87) PCT Pub. No.: WO2019/110061
PCT Pub. Date: Jun. 13, 2019

(65) Prior Publication Data
US 2021/0178534 A1    Jun. 17, 2021

(30) Foreign Application Priority Data
Dec. 6, 2017    (DK) ............................ PA 2017 70913

(51) Int. Cl.
*B23P 19/06*    (2006.01)
*F03D 13/10*    (2016.01)
(Continued)

(52) U.S. Cl.
CPC ............ *B23P 19/067* (2013.01); *F03D 13/10* (2016.05); *F03D 15/00* (2016.05); *B23P 19/065* (2013.01);
(Continued)

(58) Field of Classification Search
CPC ...... B23P 19/067; B23P 19/065; F03D 13/10; F03D 15/00; F05B 2260/301; Y02E 10/72; B25B 23/14
See application file for complete search history.

(56) References Cited

U.S. PATENT DOCUMENTS 8,763,469 B2 * 7/2014 Knoop .................. E04H 12/085
                                                        73/761
9,212,651 B2 * 12/2015 Johst ....................... F03D 13/10
(Continued)

FOREIGN PATENT DOCUMENTS

CN    201824125 U    5/2011
EP        2607685 A1    6/2013
(Continued)

OTHER PUBLICATIONS

Danish Patent and Trademark Office, Search and Examination Report in PA 2017 70913, dated Apr. 24, 2018.
(Continued)

*Primary Examiner* — Ryan J. Walters
(74) *Attorney, Agent, or Firm* — Wood Herron & Evans LLP

(57) ABSTRACT

The invention relates to a method for the controlled and automatic tensioning of bolts pre-installed in a flange joint between a hub and a main shaft in a nacelle of a wind turbine as well as to a bolt tensioning system for such method. The method comprises arranging a fixture inside the nacelle and mounting a bolt tensioning tool to the fixture which is mounted movable in an axial direction and in a working area perpendicularly hereto. First the flange joint is rotated to position a first set of bolts within the working area of the bolt tensioning tool, and then the bolt tensioning tool is controlled alternately to move the tensioning tool into a position for tensioning a bolt and to tension the bolt, until all bolts of the first set of bolts have been tensioned. The rotation of the
(Continued)

flange joint may be controlled by operating a rotation tool operably connected to the main shaft, gearbox, and/or generator.

14 Claims, 2 Drawing Sheets

(51) Int. Cl.
 *F03D 15/00* (2016.01)
 *B25B 23/14* (2006.01)
(52) U.S. Cl.
 CPC ......... *B25B 23/14* (2013.01); *F05B 2260/301* (2013.01); *Y02E 10/72* (2013.01)

(56) References Cited

U.S. PATENT DOCUMENTS

| | | | | |
|---|---|---|---|---|
| 10,120,364 | B2* | 11/2018 | Abdallah | G05B 19/402 |
| 10,702,960 | B2* | 7/2020 | Johst | B23P 19/067 |
| 11,103,966 | B2* | 8/2021 | Hohmann | B23P 19/067 |
| 2010/0139093 | A1 | 6/2010 | Koesters | |
| 2013/0185932 | A1* | 7/2013 | Imi | B23P 19/067 29/720 |
| 2013/0289769 | A1 | 10/2013 | Park et al. | |

FOREIGN PATENT DOCUMENTS

| | | |
|---|---|---|
| EP | 3163071 A1 | 5/2017 |
| EP | 3195974 A1 | 7/2017 |
| JP | H01234657 A | 9/1989 |
| KR | 20130025592 A | 3/2013 |
| KR | 101291121 B1 | 8/2013 |
| WO | 2016193297 A1 | 12/2016 |
| WO | 2017125493 A1 | 7/2017 |

OTHER PUBLICATIONS

European Patent Office, International Search Report and Written Opinion in PCT Application No. PCT/DK2018/050308, dated Feb. 21, 2019.
China National Intellectual Property Administration, First Notification of Office Action in CN Application No. 201880087951.3, dated Sep. 28, 2021.

* cited by examiner

AUTOMATED TIGHTENING OF BOLTS

FIELD OF THE INVENTION

The present invention generally relates to an automated process of tensioning a series of bolts in a flange joint between a hub and a main shaft in a nacelle of a wind turbine.

BACKGROUND OF THE INVENTION

A wind turbine consists of several large single parts that are each preassembled at a factory workshop. During erection of the wind turbine on site, the main shaft and the hub are fitted together and connected with flange joint connections using hex bolts, stud bolts or similar.

Large quantities of bolts of large sizes are necessary to establish the required stiffness and strength of the connections. In order to achieve the appropriate defined stiffness and strength in the joint connections all the bolts need to be tensioned or tightened with a predefined preload or torque.

During the erection of the wind turbine the bolts are today typically applied and pretensioned manually. This is followed by a manual procedure that applies the specified preload or torque to each bolt. During this procedure a hydraulic high torque wrench is typically used as a bolt tensioning tool. Alternatively, or additionally, the bolts may be tensioned by a bolt tensioning tool stretching the bolt.

Several factors influence the quality of the bolt tensioning process, including the temperature of the working environment, the temperature of the hydraulic fluid, and the available oil pressure that is supplied to the bolt tensioning tool.

The tightening or tensioning of every bolt is typically done manually and a high level of quality is needed in order to ensure the desired stiffness and strength of the wind turbine. Additionally, the bolts need to be positioned and tightened often under harsh and difficult working conditions that can take up to several hours for one flange connection in a wind turbine.

In case the wind turbine is damaged or in an extreme case collapses, possibly years after it was erected, it is furthermore difficult if not impossible to analyse the causes of such an accident and to document whether the bolts were tensioned according to the specifications prior to the damage or collapse.

SUMMARY OF THE INVENTION

It is an object of embodiments of the invention to provide an automated and controlled tightening solution for the tensioning of bolts in a flange joint connection between the hub and the main shaft of a wind turbine.

A further object is to provide a bolt tensioning method and system overcoming some of the drawbacks of the known manual labour intensive and difficult way of working today and additionally ensuring that the prescribed tensioning of each bolt in the flange joint is achieved.

In a first aspect the present invention relates to a method for the controlled and automatic tensioning of bolts pre-installed in a flange joint between a hub and a main shaft in a nacelle of a wind turbine, the method comprising
arranging a fixture inside the nacelle and stationary relative to the nacelle;
mounting a bolt tensioning tool to the fixture, wherein the bolt tensioning tool is mounted movable in an axial direction along a direction of the main shaft axis, and movable in a working area perpendicularly to the axial direction;
arranging a control unit to control a rotation of the flange joint, the moving of the bolt tensioning tool, and the application of tension by the bolt tensioning tool;
rotating the flange joint to position a first set of bolts within the working area of the bolt tensioning tool; and
tensioning bolts by alternately moving the tensioning tool into a position for tensioning a bolt of the first set of bolts and tensioning the bolt, until all bolts of the first set of bolts have been tensioned.

Hereby is obtained a method of obtaining a bolted flange joint connection with an improved control of the tensioning loads established of each of the individual bolts in the flange joint because of the automation of all the tensioning processes. The method is furthermore advantageously applicable in the field and on a wind turbine site both off-shore and on-shore.

Further, the use of the bolt tensioning tool mounted to the stationary fixture for operation within a working area and in combination with the rotation of the flange bringing a set of bolts into the working area for tensioning, considerably reduces the health and safety risks otherwise implied with the traditional tensioning operations where personnel would have to manually tension the bolts often in difficult and not easily accessible positions around the flange.

On the same time is obtained a method of tensioning the bolts in the flange with a considerably reduction of the required installation and service hours needed for the tensioning operations and thereby for the assembly of the main shaft and the hub. This is even more important in reducing the time that a crane is needed on site for the assembly.

The method for the controlled and automatic tensioning of the bolts is applicable both for the assembly of the hub to the main shaft and for the demounting of the hub for example when replacing a gearbox. In the latter case the tensioning is applied to each bolt to loosen the bolt, i.e. the tension is reduced. The advantage of a well-controlled and automatic tensioning process of the bolts in the flange connection is obtained for both mounting and demounting (completely or partial) of the hub.

Moreover, the method can be used during scheduled maintenance to verify and reapply tension to the bolts in the flange joint.

The bolts are pre-installed in the flange joint which may include inserting the bolts in their bolt openings and tightening the bolts a little or enough to be positioned correctly for tensioning. In case of the method being applied to dismantle the hub, the pre-installed bolts have been tensioned previously at some time when mounting the hub.

The bolts pre-installed in the flange joint may include a subset of or alternatively all the bolts of the flange joint.

The fixture is arranged inside the nacelle such as to be stationary with regards to the nacelle. The fixture may be attached to the nacelle such as to a nacelle wall, flooring or roof or to the bearing structure of the nacelle. The fixture may comprise a beam structure or another structure allowing for the positioning of the bolt tensioning tool to operate at least on a number of the bolts in the flange joint.

The bolt tensioning tool may comprise a torque wrench such as a hydraulic high torque wrench and alternatively or additionally a tool stretching the bolt to obtain the desired tension in the bolt. The tensioning tool may have the flexibility to utilize different kind of bolt types for instance hex bolts, stud bolts or similar.

The bolt tensioning tool is mounted to the fixture such as suspended therefrom, or mounted via a suspension arm, or attached thereto on rails or the like.

The bolt tensioning tool is mounted movable in an axial direction along the direction of the main shaft axis, i.e. with the axial direction being parallel or near-parallel to the main shaft axis. Normally, the bolts in a flange joint extend in parallel to the main shaft axis. Therefore, the bolt tensioning tool mounted movable in an axial direction along the direction of the main shaft axis allows for the bolt tensioning tool to be moved to engage with the bolt head and or the nut to be tensioned and into the correct position for tensioning the bolt.

Further, the bolt tensioning tool is mounted to the fixture such as to be movable within a working area perpendicularly the axial direction i.e. perpendicularly to the axis of the main shaft. The working area may extend over certain lengths in more directions or may extend primarily in one direction such as in a radial direction of the flange joint. In this way the bolt tensioning tool can be moved first in the working area into a desired position next to some bolt and then in the axial direction to engage with the bolt ready for tensioning. This mounting may be established by the bolt tensioning tool being mounted on rails, linear supports, or the like to be movable in two different directions perpendicular to and in addition to the axial direction. Alternatively this mounting may be established by the bolt tensioning tool being suspended from the fixture such as at least partly rolling or gliding directly or indirectly on a circumferential outer surface of the main shaft and movably in a transverse direction.

The flange joint is rotated around the main shaft axis either from the hub side or preferably from the main shaft side by a rotation means controlled by the control unit. The flange joint is rotated some rotation angle such as to bring a first set of bolts within the working area of the bolt tensioning tools. In this way the bolt tensioning tool can be moved in position by the control unit to be ready to engage with and tension any of the bolts of the first set of bolts as desired and in any order as decided by the control unit. The working area need not cover only the bolts of the first set but may cover additional bolts as well. The first set of bolts may comprise one or more bolts such as typically in the range of 1-6 bolts, for example 4 or 5.

In an embodiment of the invention the rotation means is a rotation tool that is operably connected to the gearbox or generator of the wind turbine.

The set of bolt may for example comprise bolts in more rows at different radial distances.

When the first set of bolts has been positioned in the working area of the bolt tensioning tool by the controlled rotation of the flange joint, the control unit then operates the bolt tensioning tool to alternately move the tensioning tool into a position for tensioning a bolt and tensioning the bolt. These operations are repeated until all the bolts of the first set of bolts have been tensioned. The tensioning of the bolts may comprise a pre-tensioning, a full tensioning, a post-tensioning or a loosening of the bolts.

In this way the first set of bolts are all tensioned effectively and in a well-controlled manner by the bolt tensioning tool without any need for manually positioning and re-positioning the tensioning tool. The method further significantly reduces the risk of unintentionally tensioning the wrong set of bolts as the set of bolts can be precisely identified and positioned by the control of the rotation angle of the flange joint. The rotating of the flange joint and the tensioning of bolts with the bolt tensioning tool under the control of the control unit further enables the logging of data including the established tensioning force of each specific bolt, which log data can be stored from the assembly, service, and/or disassembly.

Furthermore, as the tensioning method provides with a high certainty a clear and well-established tensioning of each bolt, the design and an assembly process may advantageously be optimized for example by reducing the number of bolts in the flange joint. Further, the scheduling interval of service, maintenance and inspections may be optimized.

In an embodiment, the method further comprises subsequently rotating the flange joint to position a second set of bolts within the working area of the bolt tensioning tool.

In an embodiment, the second set of bolts is positioned away from the first set of bolts in the flange joint. Away from is here to be understood as anything but next to. Hereby is obtained the tensioning of a further set of bolts in the flange joint.

As the sets of bolts are not positioned next to each other a tensioning of the flange connection is achieved wherein the bolts are first tensioned in different locations or areas distributed across the flange joint. Hereby is obtained a more even tensioning of the flange joint with a more even distribution of the loads between all the bolts in the flange.

Because of the controlled rotation of the flange joint between the tensioning of the sets of bolts, the tensioning process is simplified greatly in comparison to a traditional manual tensioning procedure. Further, the controlled rotation ensures that the correct second set of bolts is tensioned which may otherwise be difficult to determine bearing in mind the size of a wind turbine flange joint and the difficult working conditions inside the nacelle and around the main shaft.

The second set of bolts may comprise the same or a different number of bolts as compared to the first set of bolts.

In an embodiment, the method further comprises subsequently repeating the steps of rotating the flange joint and tensioning bolts with the bolt tensioning tool until all bolts in the flange joint have been tensioned. Hereby is obtained a well-controlled tensioning of all the bolts in the flange joint and with a clear evidence of the tensioning force applied to each and every bolt.

The tensioning operations may optionally include re-visiting the same or partly the same set of bolts as visited and tensioned earlier. In this way, a set of bolts may for example be first pre-tensioned and later fully tensioned.

In an embodiment, the rotation of the flange joint is controlled according to a predefined sequence of rotation angles. Hereby, the tensioning process can be controlled such as to obtain an even loading on all the bolts during the assembly and avoiding any too high tensioning loads. Further, the tensioning process may be aligned with the mounting or dismounting of the wind turbine blades and/or other parts of the wind turbine. The pattern established by the sequence of rotation angles is predefined to ensure the correct pre-tensioning of the flange joint.

In an embodiment of the invention, the control unit is configured to log for each bolt a bolt identification parameter and the tension applied to the bolt. Hereby may be established by simple means a log linking the bolt tension as applied to each bolt as identified by the identification parameter and which may therefore later be easily re-identified for example during maintenance or troubleshooting. The identification parameter may for example be a 1D or 2D barcode such as a QR or matrix code, or may be a soft identifier stored in the memory of the control unit.

In an embodiment, the bolt identification parameter is determined by the position of the bolt in the flange joint relative to a reference point. The reference point may for example be a visual or otherwise detectable marking on the flange joint or on an outer surface of the main shaft. When one bolt position is determined and/or registered, the position of all other bolts can be referenced in relation to this first bolt. For example the bolt number in a counter clockwise/clockwise direction from the first bolt, or more preferably its angular distance from the first bolt as determinable from the controlled rotation of the flange joint.

In an embodiment, the method further comprises initially rotating the flange joint to line up to a fixed flange reference point. In this way the start orientation of the flange joint is well-established and well-controlled by simple means. The method may further include in a first step and before installing the bolt to align the bolt holes in the main shaft and the hub flange by rotating the main shaft.

According to a further embodiment of the invention, the rotation of the flange joint is controlled by operating a rotation tool operably connected to the main shaft, gearbox, and/or generator. The rotation tool may for example comprise one or more turner gear motors connected to effectively rotate the main shaft and the flange joint with it. The turner gear motors may be the same as sometimes used after manufacture and during transportation of the drive train to the site to avoid a complete standstill of the rotating parts. Hereby the turner gear already mounted in the nacelle can advantageously be additionally used during the assembly of the flange connection between the hub and the main shaft.

In an embodiment, the method further comprises obtaining by an image capturing device, such as e.g. a camera, one or more images of a least a part of the flange joint. The bolt tensioning tool may then be positioned depending on a result of processing at least some of the obtained images. Hereby is obtained a precise positioning of the bolt tensioning tool prior to the application of the tensioning forces. The processing of the obtained images may be performed by a computer vision method or may optionally involve some input from a personnel performing based on a display of the images.

Alternatively or additionally, optical sensors may be used for determining the precise position of the bolt tensioning tool relative to the bolt.

In a further aspect, the present invention relates to a bolt tensioning system for the controlled and automatic tensioning of bolts pre-installed in a flange joint between a hub and a main shaft in a nacelle of a wind turbine, the system comprising
  a fixture arranged inside the nacelle and stationary relative to the nacelle, and
  a bolt tensioning tool mounted to the fixture, wherein the bolt tensioning tool is mounted movable in an axial direction along a direction of the main shaft axis, and movable in a working area perpendicularly to the axial direction,
the system further comprising a control unit configured to control a rotation of the flange joint and coupled to the bolt tensioning tool to control the moving of the bolt tensioning tool, and the application of a tension by the bolt tensioning tool, wherein the control unit is configured for controlling the rotation of the flange joint to position a first set of bolts within the working area of the bolt tensioning tool and controlling the bolt tensioning tool alternately to move into a position for tensioning a bolt of the first set of bolts and to tension the bolt, until all bolts of the first set of bolts have been tensioned.

The advantages hereof are as mentioned in relation to the automatic tensioning method described in the previous.

In an embodiment the bolt tensioning system according to the above comprises a rotation tool operably connected to the main shaft, gearbox, and/or generator, and wherein the control unit is coupled to the rotation tool to control the rotation of the flange joint.

BRIEF DESCRIPTION OF THE DRAWINGS

In the following different embodiments of the invention will be described with reference to the drawings, wherein.

DETAILED DESCRIPTION OF THE DRAWINGS

Figure 1:
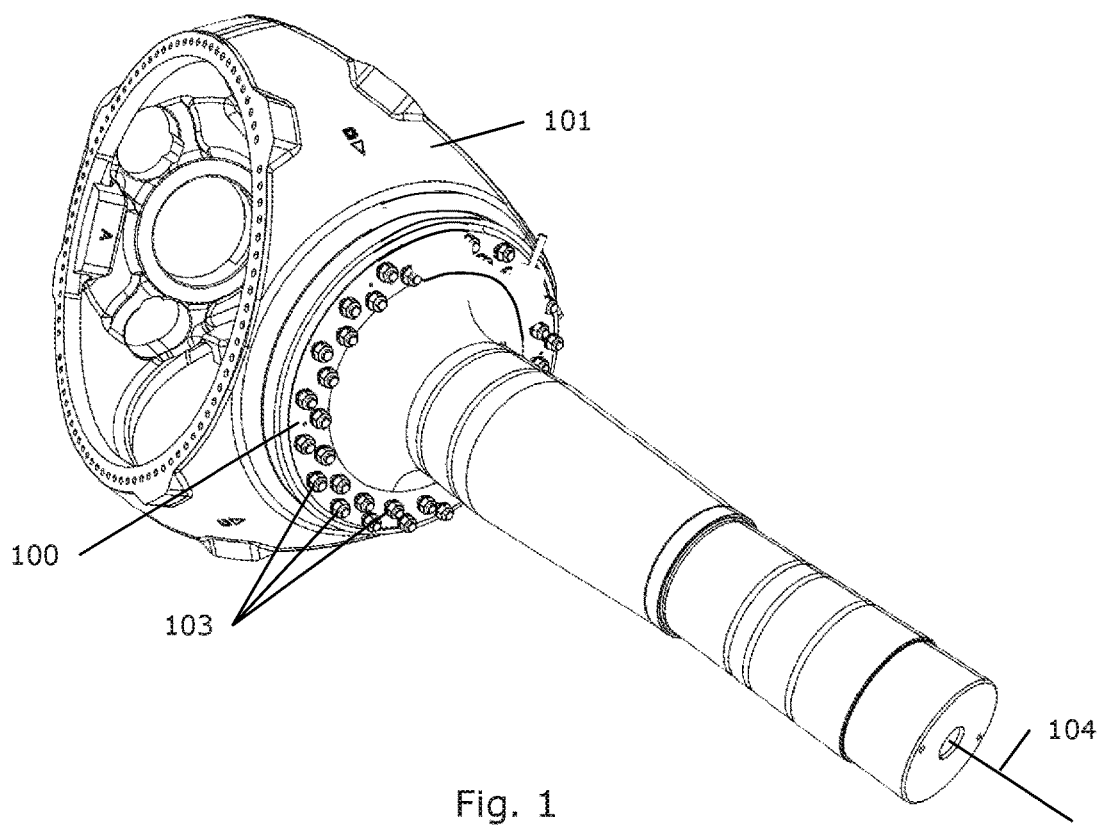
FIG. 1 shows the bolted flange joint coupling between a wind turbine hub and the main shaft.

FIG. 1 shows the flange joint 100 between a wind turbine hub 101 and the main shaft 102 of a wind turbine. The flange joint connection 100 is here established by a number of tensioned bolts 103.

Figure 2:
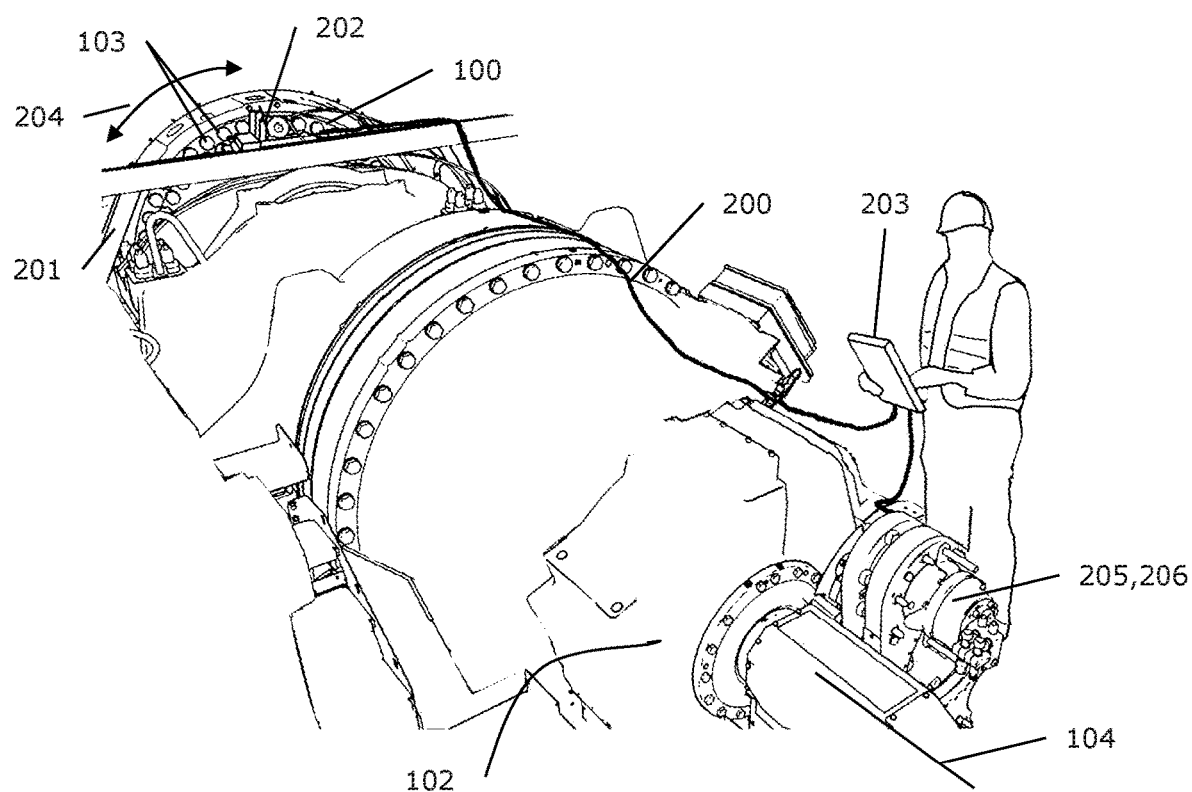
FIG. 2 illustrates an embodiment of the system and method for the controlled and automatic tensioning of bolts pre-installed in a flange joint between a hub and a main shaft in a nacelle of a wind turbine.

FIG. 2 shows a view from the inside of a wind turbine nacelle and illustrates a bolt tensioning system 200 and the method of controlled and automatic tensioning according to an embodiment of the invention. A number of bolts 103 are pre-installed in the flange joint 100 between the hub (not shown) and the main shaft 102, which is here outlined in connection with parts of the drive train. The main shaft extends along the main shaft axis 104. A fixture 201 is arranged inside the nacelle and stationary relative to the nacelle. Here, the fixture 201 comprises a beam structure which is attached to the nacelle floor. This is shown in more details in FIG. 3.

Figure 3:
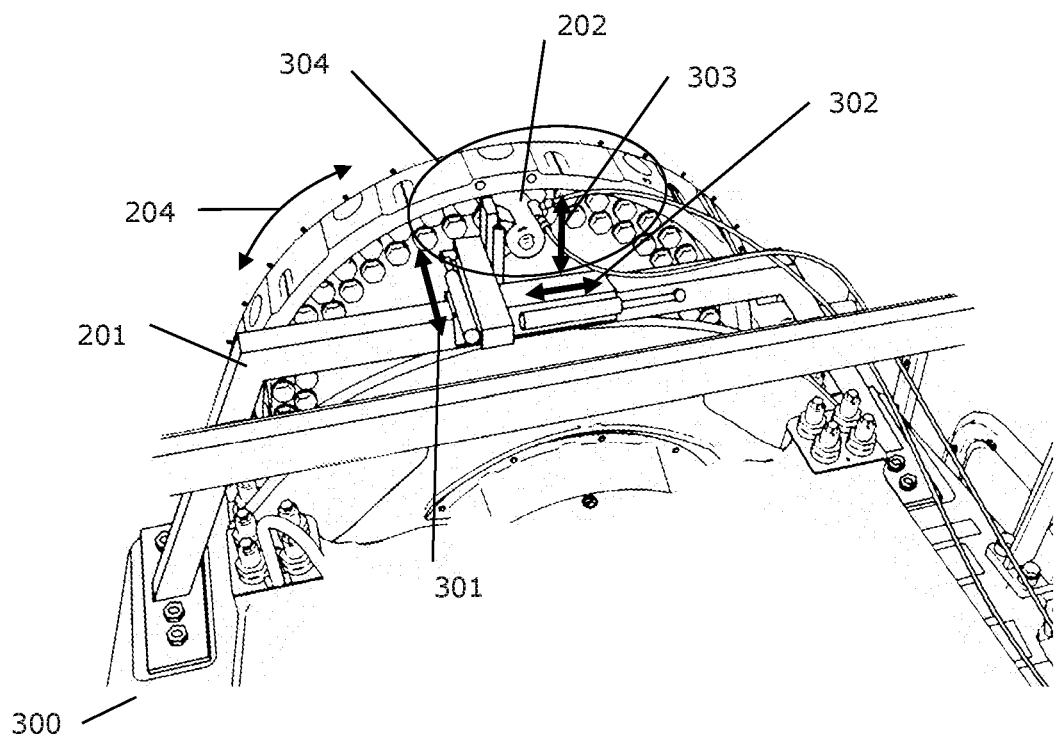
FIG. 3 is a sketch of a mounting of a bolt tensioning tool in a fixture as illustrated in FIG. 2 in more detail.
Figure 4:
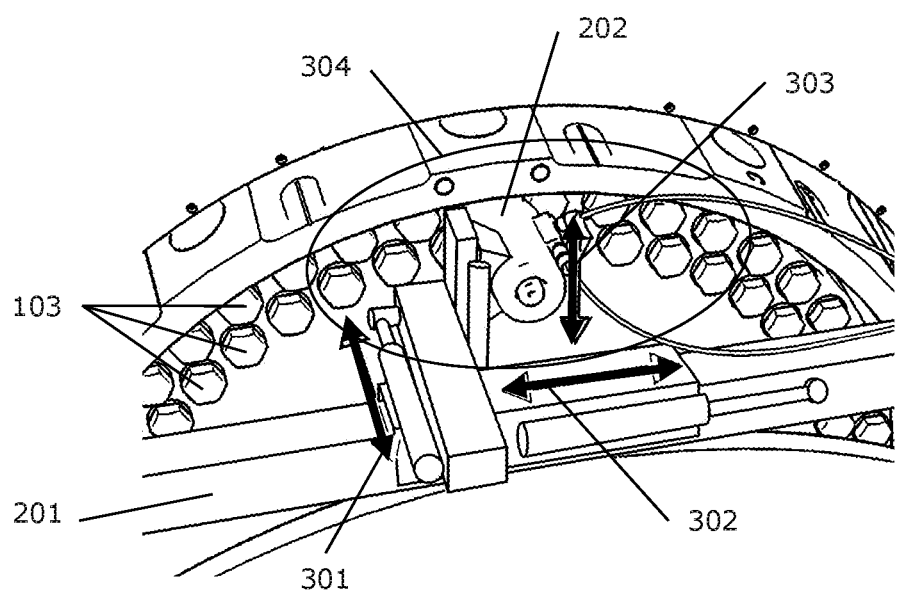
FIG. 4 shows the bolt tensioning tool of FIG. 3 in a closer view.

A bolt tensioning tool 202 is mounted to the fixture 201 as will be shown and explained in more details in relation to FIGS. 3 and 4.

A control unit 203 is connected to the bolt tensioning tool 202 and can control the moving of the tool axially and transversal. The control unit 203 is further configured to control a rotation (illustrated by the arrow 204) of the flange joint 100. The rotation 204 of the flange joint is controlled via the operation of a rotation tool 205. In the shown embodiment, the rotation tool 205 is a turner gear motor 206 coupled to the main shaft 102.

The control unit 203 is then configured and operated for alternatingly controlling the rotation of the flange joint 100 and the operation of the bolt tensioning tool 202, first rotating the flange joint 100 such as to bring a desired set of bolts 103 into the working area of the bolt tensioning tool 202, and secondly operating the tensioning tool 202 to successively be in position for engaging with a bolt and then tensioning the bolt. When all bolts in the set of bolts have been tensioned, the flange joint is again rotated and a second set of bolts tensioned, and so on until all bolts in the flange joint have been tensioned.

If the method is applied for the assembly of the hub to the main shaft, the tensioning may in the first steps comprise only pre-tensioning or pre-tightening the bolt, and then in later steps revisiting the same sets of bolts for a full tensioning of the bolts.

The method and system may equally well be applied to remove tension of the installed bolts for example for dismantling the hub. The applied tension to the bolts is then negative.

FIGS. 3 and 4 show the bolt tensioning tool 202 in greater detail. The tensioning tool 202 is mounted to the fixture 201, which here is built of a number of beams forming a bridge over the main shaft 102 (not shown) and bolted to the nacelle structure 300. The bolt tensioning tool is mounted movable in the three directions shown by arrows 301, 302, 303. By moving the tensioning tool in the two directions 302 and 303, the tensioning tool covers a working area as outlined by the line 304. In other words, the tensioning tool can be moved to tension any bolt positioned within this working area 304. The tensioning tool 202 is further movable in an axial direction 301 along a direction of the main shaft axis 104. Hereby, the tensioning tool, when positioned in front of a bolt, can be moved axially into position and into engagement with the bolt. The bolt can then be tensioned by operation of the bolt tensioning tool as controlled by the control unit.

In this embodiment, the bolt tensioning tool 202 is mounted to the fixture 201 via a number of rails (not shown) and moved by a number of hydraulics or stepper motors or the like.

The tensioning method may include rotating the flange joint and moving and operating the bolt tensioning tool according to a predefined sequence of rotation angles and pre-defined sets of bolts. In this way the bolts of the flange joint are tensioned in a predefined pattern determined to yield the optimal bolt tensioning.

The tensioning scheme may involve the mounting of the wind turbine blades in between steps of bolt tensioning where a favourable hub orientation is exploited for the attachment of a blade.

A flange joint tensioning scheme may as an example comprise the steps of: calibrating and aligning the bolt holes in the main shaft and hub flange by turning the main shaft, manually placing a number of bolts in the flange joint, rotating the flange joint to line up to some fixed flange reference point, pre-tensioning a first set of bolts, rotating the flange joint a predetermined rotation angle of around ⅓ of a full rotation, pre-tensioning a second set of bolts, rotating the flange joint approximately another ⅓ of a full rotation and pre-tensioning a third set of bolts. The connection between the hub and main shaft may now be stable and safe and the lifting equipment can be removed and the crane can be directed to a new position. If not already done, the remaining bolts are then manually placed in the flange joint connection.

The tensioning procedure of alternatingly rotating the flange and tensioning a set of bolts is then repeated to pre-tighten the remaining bolts in the flange joint connection. Hereafter the tensioning procedure of alternatingly rotating the flange and tensioning a set of bolts is performed again to fully tensioning all the bolts in the flange joint. A documentation report of the tensioning process is created during operation or as a last step preferably including information on the tension loads as applied to each bolt together with a bolt identification parameter allowing for later identification of each bolt in the flange connection.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method for the controlled and automatic tensioning of bolts pre-installed in a flange joint between a hub and a main shaft in a nacelle of a wind turbine, the method comprising
    arranging a fixture inside the nacelle and stationary relative to the nacelle;
    mounting a bolt tensioning tool to the fixture, wherein the bolt tensioning tool is mounted movable in an axial direction along a direction of the main shaft axis, and movable in a working area perpendicularly to the axial direction;
    arranging a control unit to control a rotation of the flange joint, the moving of the bolt tensioning tool, and the application of tension by the bolt tensioning tool;
    rotating the flange joint to position a first set of bolts within the working area of the bolt tensioning tool; and
    tensioning bolts by alternately moving the tensioning tool into a position for tensioning a bolt of the first set of bolts and tensioning the bolt, repeating the moving and tensioning steps for each respective bolt of the first set of bolts until all bolts of the first set of bolts have been tensioned.

2. The method according to claim 1 further comprising subsequently rotating the flange joint to position a second set of bolts within the working area of the bolt tensioning tool.

3. The method according to claim 2, wherein the second set of bolts is positioned away from the first set of bolts in the flange joint.

4. The method according to claim 1 comprising subsequently repeating the steps of rotating the flange joint and tensioning bolts, until all bolts in the flange joint have been tensioned.

5. The method according to claim 1, wherein the rotation of the flange joint is controlled according to a predefined sequence of rotation angles.

6. The method according to claim 1, wherein the control unit is configured to log for each bolt a bolt identification parameter and the tension applied to tension the bolt.

7. The method according to claim 6, wherein the bolt identification parameter is determined by the position of the bolt in the flange joint relative to a reference point.

8. The method according to claim 1 further comprising initially rotating the flange joint to line up to a fixed flange reference point.

9. The method according to claim 1, wherein the rotation of the flange joint is controlled by operating a rotation tool operably connected to the main shaft, gearbox, and/or generator.

10. The method according to claim 1 further comprising obtaining, by an image capturing device, one or more images of a least a part of the flange joint.

11. The method according to claim 10, wherein the bolt tensioning tool is positioned depending on a result of processing at least some of the obtained images.

12. The method according to claim 1 wherein the tensioning of a bolt is applied to loosen the bolt.

13. A bolt tensioning system for the controlled and automatic tensioning of bolts pre-installed in a flange joint between a hub and a main shaft in a nacelle of a wind turbine, the system comprising
    a fixture arranged inside the nacelle and stationary relative to the nacelle, and a bolt tensioning tool mounted to the fixture, wherein the bolt tensioning tool is mounted movable in an axial direction along a direction of the main shaft axis, and movable in a working area perpendicularly to the axial direction, the system further comprising a control unit configured to control a rotation of the flange joint and coupled to the bolt tensioning tool to control the moving of the bolt tensioning tool, and the application of tension by the bolt tensioning tool, wherein the control unit is configured for controlling the rotation of the flange joint to position a first set of bolts within the working area of the bolt tensioning tool and controlling the bolt tensioning tool alternately to move into a position for tensioning a bolt of the first set of bolts and to tension the bolt, until all bolts of the first set of bolts have been tensioned.

14. The bolt tensioning system according to claim 13, wherein the system comprises a rotation tool operably connected to the main shaft, gearbox, and/or generator, and wherein the control unit is coupled to the rotation tool to control the rotation of the flange joint.

\* \* \* \* \*